Dec. 24, 1946.　　A. L. FORBES, JR　　2,413,103
EXPANDING HEAD
Filed Oct. 26, 1944　　3 Sheets-Sheet 1

Inventor
Arthur L. Forbes Jr.
By
E. V. Hardway,
Attorney

Dec. 24, 1946.   A. L. FORBES, JR   2,413,103
EXPANDING HEAD
Filed Oct. 26, 1944   3 Sheets-Sheet 2

Inventor
Arthur L. Forbes Jr.

By
E. J. Hardway
Attorney

Patented Dec. 24, 1946

2,413,103

UNITED STATES PATENT OFFICE 2,413,103

EXPANDING HEAD

Arthur L. Forbes, Jr., Houston, Tex., assignor to Pressure Weld Company, Houston, Tex., a corporation of Delaware Application October 26, 1944, Serial No. 560,473

2 Claims. (Cl. 113—103)

This invention relates to an expanding head, particularly adapted for use in the process of welding pipes together.

The head has been particularly designed for use in the construction of pipe lines whose sections are welded together.

Another object of the invention is to provide an expanding head of the type described which is adapted to be located within the adjacent ends of the pipes to be welded together and which includes means for expanding the head against said adjacent ends so that the ends will be brought to perfectly round shape, if out of round, in order that the ends to be welded together will perfectly register.

A further object of the invention resides in novel means for expanding the head.

It is a further object of the invention to provide, in a head of the character described, retractable stops provided to accurately locate the head with respect to the joint between the pipe sections with means for retracting the stops upon initial expansion of the head.

With the above and other objects in view the invention has particular relation to certain novel features of construction, operation and arrangement of parts, an example of which is given in this specification and illustrated in the accompanying drawings, wherein—

Figure 1:
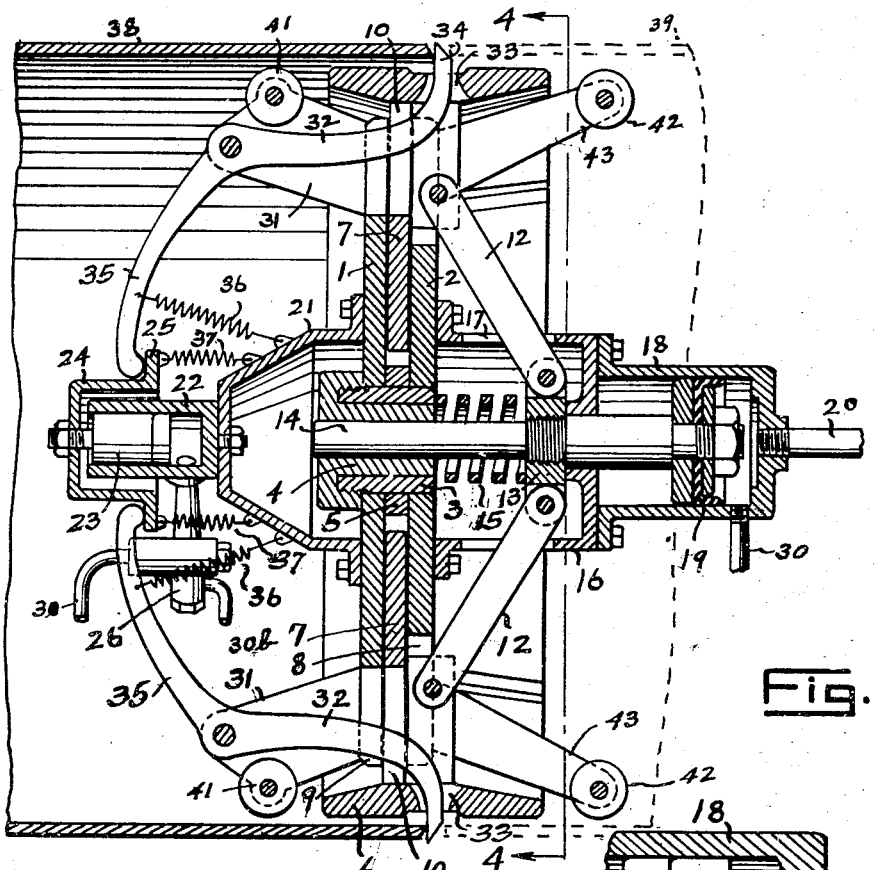
Figure 1 shows a longitudinal, sectional view of the head.

Referring now more particularly to the drawings, wherein like numerals of reference designate the same parts in each of the figures, the numerals 1 and 2 designate inner and outer plates which are arranged concentric. There is a tubular nipple 3, concentric with and extended through both plates. It is welded to the plate 2 and extends through and beyond the plate 1. Its extended end is outwardly threaded. A tubular bushing 4 is extended through the nipple and is screwed onto the threaded end of the nipple and is formed with a head which abuts the outer side of the plate 1. Around the nipple and between the plates there is an annular spacer 5. The parts hereinabove referred to may be designated as the frame of the head and, of course, may be varied in specific construction.

Around this frame are the shoes 6, four of said shoes being shown. They are of arcuate shape, their outer surfaces being curved to conform to the desired inside contour of the pipe—that is, the outer surfaces of the shoes, when the head is expanded, are of a cylindrical contour.

Each shoe has a plate like web 7 which extends radially inwardly between the plates of the frame as more accurately shown in Figure 1.

Figure 4:
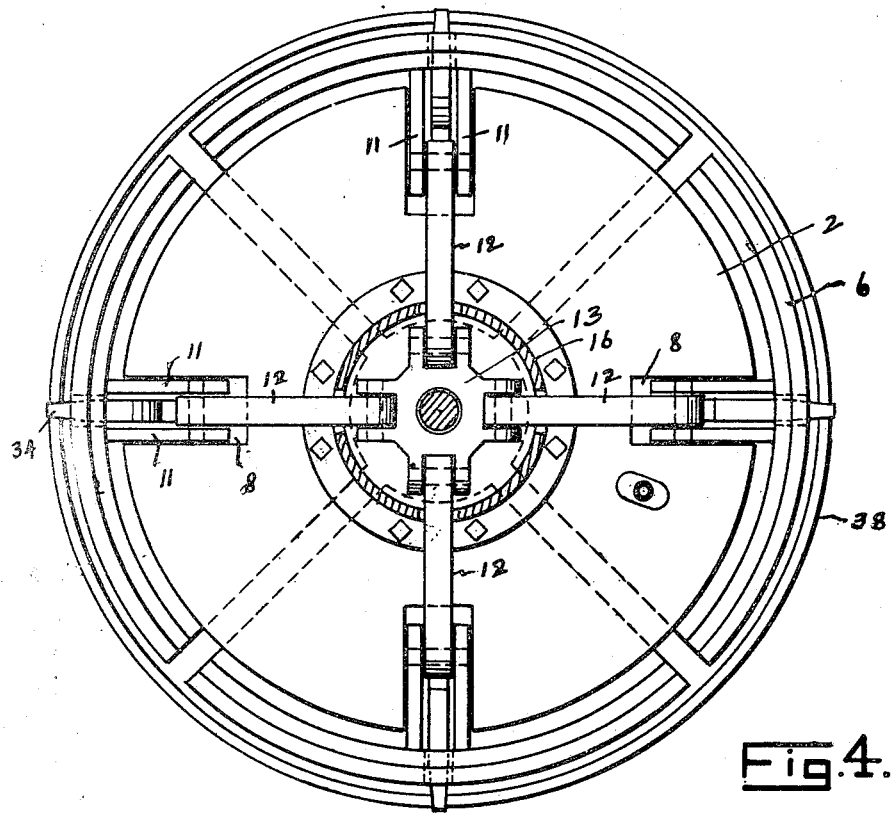
Figure 4 shows a sectional view taken on the line 4—4 of Figure 1.
Figure 5:
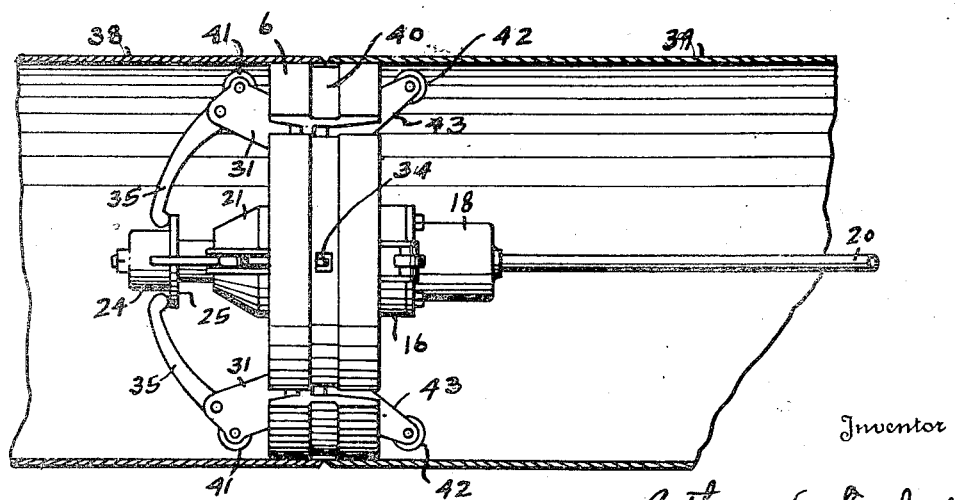
Figure 5 shows a plan view of the head located in the pipe line and shown in active, or expanded, position.

The frame plates have the marginal registering slots 8 and 9 as shown in Figures 1 and 4. The slots 8 are somewhat wider, and extend somewhat further radially inwardly, than the slots 9. The webs 7 also have the marginal slots 10 which register with the slots 9.

Fastened to the webs 7 on opposite sides of the slots 10 thereof and extending outwardly through the slots 8 are the pairs of lugs 11, 11, the lugs of the respective pairs being spaced apart. Toggle links 12 have their outer ends pivoted between the respective pairs of lugs 11 and have their inner ends pivotally connected to a hub 13. This hub is fixed on a plunger rod 14 whose inner end slides through the bushing 4 and a strong coil spring 15 surrounds said rod and is interposed between the frame and the hub 13 and normally holds the hub outwardly thus holding the shoes 6 inwardly or in retracted position. The hub 13 and spring 15 are surrounded by a housing 16 which may be bolted to the frame and whose outer end is formed with a central bearing through which the plunger rod 14 works. The housing 16 has suitable side slots 17 through which the toggle links 12 may work.

Fastened to the outer end of the housing 16 there is a cylinder 18 within which there is a plunger 19 connected to the outer end of the plunger rod 14. Connected into the outer end of the cylinder 18 there is a suitable pressure line 20 through which a pressure fluid such as oil may be admitted into the cylinder 18.

Upon application of pressure to the plunger 19 it is obvious that it will be forced inwardly overcoming the pressure of the spring 15 and operating, through the toggle links 12, to expand the shoes of the pressure head.

Bolted, or otherwise secured, to the frame plate 1, there is a hood 21 which surrounds and encloses the corresponding end of the bushing 4 and the plunger rod 14.

Fastened to the inner end of the hood 21 there is a cylinder 22 reciprocable in which there is a plunger 23 and fastened to this plunger and surrounding the outer end of the cylinder 22 there is a cap 24 having an outwardly extended inner end flange 25.

Figure 2:
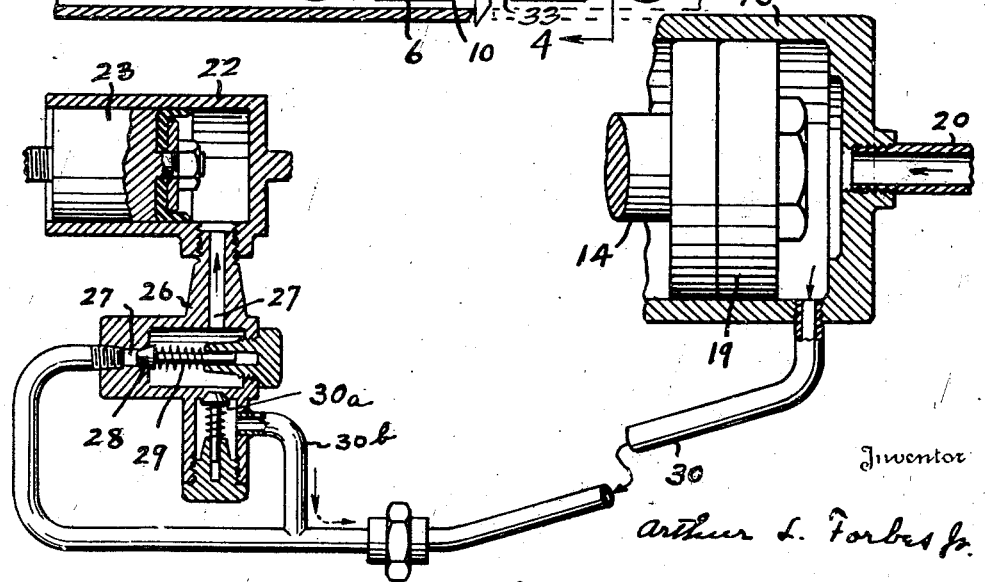
Figure 2 shows an enlarged, fragmentary, sectional view of the pressure applying means for retracting the stops and expanding the head.

Connected into the inner end of the cylinder 22 there is a valve housing 26 having an inlet passageway 27 which is controlled by the inlet valve 28 normally held closed by a pressure spring 29. A line 30 leads from the outer end of the cylinder 18 and is connected into the inlet passageway 27, as shown in Figure 2. The inlet passageway 27 also forms a relief passageway which is controlled by the relief valve 30a. The purpose and operation of these valves will be hereinafter more specifically explained.

Figure 3:
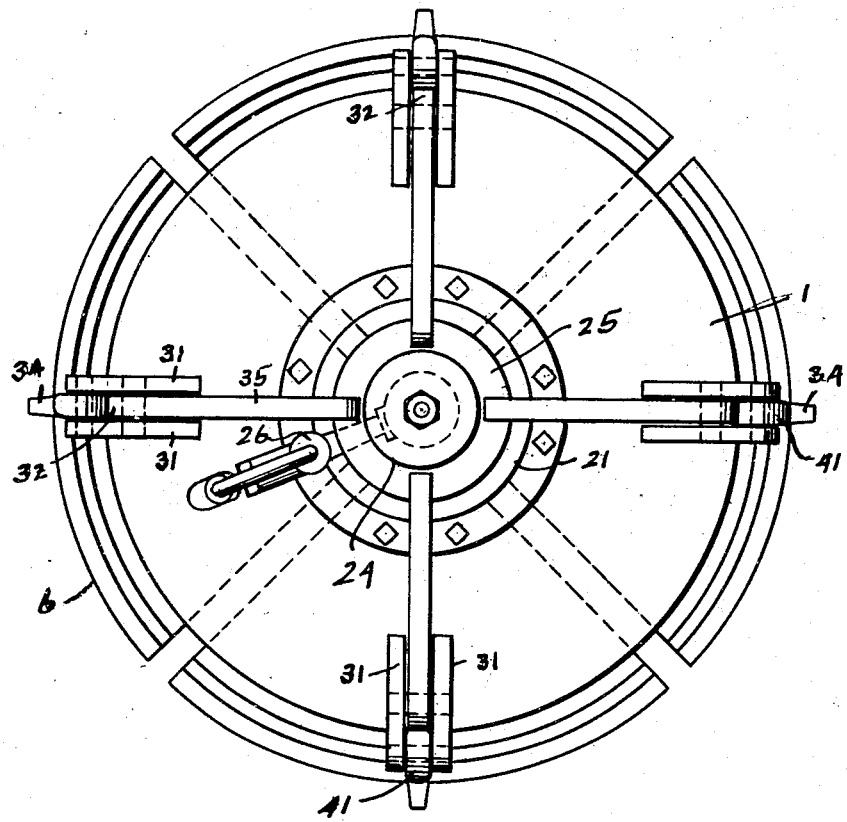
Figure 3 shows an end view of the head.

On opposite sides of the slots 9 and secured to the frame plate 1 are the pairs of arms 31, 31 more accurately shown in Figures 1 and 3. The arms of each pair are spaced apart and pivotally mounted between them are the stop members 32, shown more accurately in Figure 1. These stop members are curved outwardly through the slots 9 and 10 and their outer ends projected through corresponding openings 33 in the shoes 6, and for the stops 34 whose forward sides are beveled, as shown in Figure 1. Formed integrally with the pivoted ends of the stop members 32 are the arms 35 which extend radially inwardly and whose inner ends engage behind the flange 25 as shown in Figure 1. These arms are connected to the hood 21 by means of the yieldable members 36 and the flange 25 is connected to said hood by the yieldable members 37. These yieldable members 36, 37 are preferably in the form of coil springs.

Normally the spring 15 will hold the shoes 6 retracted, or in their inner position, and the springs 36 will hold the stops 34 outwardly or in active position. The head may be inserted into the end of the pipe line 38, or other pipe to which a section is to be welded. The stops 34 will engage the end of the pipe line so as to regulate the distance of insertion. As is indicated in Figure 1 the shoes should be inserted about one-half of their length into the pipe line. The section 39 to be welded on may then be brought into alignment with the section 38 and its end, adjacent the pipe line, or section, 38 moved over the shoes 6 into the position indicated in dotted lines in Figure 1. Pressure may then be applied through the line 20 into the cylinder 18 and this pressure will pass also through the branch line 30b. The spring 29 may be made of any desired strength, usually it is of a strength to require about fifty pounds pressure to open the valve 28 and admit pressure into the cylinder 22. This initial pressure will operate through the toggle links 12 to cause the shoes to contact the opposing ends of the respective pipes 38 and 39 and will force the plunger 23 and cap 24 outwardly thus acting through the arms 35 to retract the stops 34. The section 39 may then be forced into direct contact with the end of the pipe line 38 by a pipe welding machine, or other appliance, adapted for the purpose and as the pressure in the cylinder 18 is further built up the shoes will be further expanded and will bring the abutting ends of the pipes into perfectly round shape, if out of round. The abutting ends may then be welded together by the application of heat from the welding machine referred to. When the weld is completed the ends of the pipe welded together will be slightly up set inwardly and the head is provided with a circumferential groove 40 to provide space for the up set material.

The pressure fluid may be supplied from any suitable source. When the pressure is relieved the spring 15 will force the plunger 19 outwardly or in the reverse direction thus acting through the toggle links 12 to withdraw the shoes 6 inwardly and thus contract the head and the pull of the springs 37 will move the plunger 23 inwardly of its cylinder 22 thus forcing the pressure fluid back through the duct 27, past the relief valve 30a and through the branch line 30b and back through the line 30.

The head may then be withdrawn through the added section 39 until it is in the same relation to said added section, as is shown in Figure 1 and another section added as before. The pressure line 20 may be used for withdrawing the head and this line may be either a pipe or a hose of sufficient strength for the purpose.

The head is provided with a carriage to facilitate its withdrawal through the added section 39. This carriage includes the rear wheels 41 mounted between the arms 31 as well as the front wheels 42 which are mounted between the forwardly extended arms 43 which are anchored to the front plate 2 of the frame.

What I claim is:

1. An expanding head for registering the adjacent ends of aligned pipes to be welded together and for reshaping said ends, if distorted, comprising, a frame composed of concentric plates, means for fixing said plates in spaced relation, a series of expanders mounted to move radially on the frame and having curved outer faces arranged to move simultaneously into contact with the inside of the pipe ends, upon outward movement of the expanders, said faces when expanded defining an approximately cylindrical contour, webs fixed to the expanders and extending radially inwardly between the plates, means responsive to the pressure of an operating fluid for moving the expanders outwardly to move said faces into contact with the inside of the adjacent pipe ends and means for moving the expanders inwardly to released position upon relief of said pressure.

2. An expanding head for registering the adjacent ends of aligned pipes to be welded together and for reshaping said ends, if distorted, comprising, a frame composed of approximately concentric members, means for fixing said members in spaced relation, a series of expanders mounted to move radially on the frame and having outer faces arranged to move simultaneously into contact with the inside of the pipe ends upon outward movement of the expanders, said faces when expanded defining an approximately cylindrical contour, webs fixed to the expanders and extending radially inwardly between said members, radially movable retractable stops on the head which extend out beyond the head when the expanders are in their inner position, means responsive to the pressure of an operating fluid for moving the expanders outwardly to move said faces into contact with the inside of the adjacent pipe ends, means for automatically retracting said stops upon such movement and means for moving the expanders inwardly to released position upon relief of the pressure.

ARTHUR L. FORBES, Jr.